United States Patent
Heikinheimo et al.

(10) Patent No.: US 11,232,793 B1
(45) Date of Patent: Jan. 25, 2022

(54) METHODS, SYSTEMS AND VOICE MANAGING SERVERS FOR VOICE RECOGNITION TO PERFORM ACTION

(71) Applicant: Chief Chief Technologies Oy, Helsinki (FI)

(72) Inventors: Hannes Heikinheimo, Helsinki (FI); Janne Pylkkönen, Espoo (FI); Antti Ukkonen, Espoo (FI); Markus Lång, Espoo (FI); Samu Tamminen, Helsinki (FI); Juho Kilpikoski, Helsinki (FI)

(73) Assignee: Chief Chief Technologies Oy, Helsinki (FI)

( * ) Notice: Subject to any disclaimer, the term of this patent is extended or adjusted under 35 U.S.C. 154(b) by 0 days.

(21) Appl. No.: 17/216,860

(22) Filed: Mar. 30, 2021

(51) Int. Cl.
    *G10L 15/22* (2006.01)
    *G10L 15/10* (2006.01)
(52) U.S. Cl.
    CPC .............. *G10L 15/22* (2013.01); *G10L 15/10* (2013.01)
(58) Field of Classification Search
    None
    See application file for complete search history.

(56) References Cited

U.S. PATENT DOCUMENTS

| | | | | |
|---|---|---|---|---|
| 6,816,830 B1* | 11/2004 | Kempe | ................. | G06F 40/216 704/9 |
| 8,812,299 B1* | 8/2014 | Su | ........................... | G06F 40/30 704/9 |
| 10,026,401 B1* | 7/2018 | Mutagi | .................. | G06F 3/167 |
| 10,482,904 B1* | 11/2019 | Hardie | .................... | G10L 25/87 |
| 10,685,669 B1* | 6/2020 | Lan | ...................... | G10L 15/1822 |
| 2003/0093263 A1* | 5/2003 | Chen | ..................... | G06F 40/289 704/10 |
| 2007/0118357 A1* | 5/2007 | Kasravi | ................ | G06F 40/232 704/10 |
| 2011/0301941 A1* | 12/2011 | De Vocht | ............. | G06F 40/216 704/9 |

(Continued)

OTHER PUBLICATIONS

Toutanova, Kristina, et al. "Feature-rich part-of-speech tagging with a cyclic dependency network." Proceedings of the 2003 Human Language Technology Conference of the North American Chapter of the Association for Computational Linguistics. 2003. (Year: 2003).*

*Primary Examiner* — Jonathan C Kim
(74) *Attorney, Agent, or Firm* — Ziegler IP Law Group, LLC

(57) ABSTRACT

A method for voice recognition to perform an action. The method includes receiving a voice command, identifying a first action intended word from the voice command, assigning a confidence score to the first action intended word, altering the confidence score of the first action intended word in a temporal manner, based on confidence scores of second action intended words following the first action intended word in the voice command, identifying the action when the confidence scores of the first and second action intended words reach a pre-determined confidence score associated therewith, and performing the identified action. Disclosed also is a system for voice recognition to perform an action. The system includes one or more voice-controlled devices, and a voice managing server communicably coupled to the one or more voice-controlled devices. The voice managing server for voice recognition to perform an action using the aforementioned method.

15 Claims, 4 Drawing Sheets

(56) References Cited

U.S. PATENT DOCUMENTS

| | | | | |
|---|---|---|---|---|
| 2015/0332673 A1* | 11/2015 | Li | ............................ | G06F 40/30 |
| | | | | 704/235 |
| 2016/0012038 A1* | 1/2016 | Edwards | .................. | G06F 40/30 |
| | | | | 704/9 |
| 2017/0154033 A1* | 6/2017 | Lee | .......................... | G10L 15/16 |
| 2018/0082680 A1* | 3/2018 | Pereg | ....................... | G10L 15/19 |

* cited by examiner

METHODS, SYSTEMS AND VOICE MANAGING SERVERS FOR VOICE RECOGNITION TO PERFORM ACTION

TECHNICAL FIELD

The present disclosure relates generally to speech recognition; and more specifically, to methods, systems and voice managing servers for voice recognition to perform actions.

BACKGROUND

Technological advancement in automation, and especially in smart devices and control systems, has made life better for the users as compared to the conventional "non-so-smart" counterparts. Smart technology enables operating one or more devices (smart, smart-connected, or internet of things (IoT)) over internet, Wi-Fi, Bluetooth, near-field connection, artificial intelligence, and other means of connectivity, through an intuitive user-interface associated with a central system or an app.

Recent advancements in natural language processing and cloud services particularly have contributed to mass adoption of voice-controlled (or voice-activated) devices. Typically, the voice-activated devices are associated with speech recognition software that allows the user to speak in their natural language and converts them into machine-readable format. Conventional automated and smart devices are typically voice-activated devices. Notably, voice commands from users are relayed to the devices for operation thereof, more conveniently.

However, conventional voice-activated devices are configured to receive the complete voice command, for example "Hey Alexa, Please switch off the lights from the living room", record the voice command, analyze the voice recorded command to determine the intention of the voice command, i.e. turning the lights off from the living room. As a result, such conventional systems result in delay between receiving voice commands and performing desired action corresponding to the said voice command. Moreover, the conventional systems may fail to differentiate between words of similar pronunciation or different meanings for example "Switch" may be a noun and a verb, thus result in an ineffective automation of the said device.

Therefore, in light of the foregoing discussion, there exists a need to overcome the aforementioned drawbacks with conventional methods of speech recognition and associated automation.

SUMMARY

The present disclosure seeks to provide a method for voice recognition to perform an action. The present disclosure also seeks to provide a system for voice recognition to perform an action. The present disclosure also seeks to provide a voice managing server for voice recognition to perform an action. An aim of the present disclosure is to provide a solution that overcomes at least partially the problems encountered in prior art.

In one aspect, an embodiment of the present disclosure provides a method for voice recognition to perform an action, the method comprising:
  receiving a voice command,
  identifying a first action intended word from the voice command,
  assigning a confidence score to the first action intended word,
  altering the confidence score of the first action intended word in a temporal manner, based on confidence scores of second action intended words following the first action intended word in the voice command,
  identifying the action when the confidence scores of the first and second action intended words reach a pre-determined confidence score associated therewith, and
  performing the identified action.

In another aspect, an embodiment of the present disclosure provides a system for voice recognition to perform an action, the system comprising:
  one or more voice-controlled devices, and
  a voice managing server communicably coupled to the one or more voice-controlled devices, the voice managing server operable to
  receive a voice command,
  identify a first action intended word from the voice command,
  assign a confidence score to the first action intended word,
  alter the confidence score of the first action intended word in a temporal manner, based on confidence scores of second action intended words following the first action intended word in the voice command,
  identify the action when the confidence scores of the first and second action intended words exceed a pre-determined confidence score associated therewith, and
  perform the identified action associated with one or more voice-controlled devices.

In yet another aspect, an embodiment of the present disclosure provides a voice managing server for voice recognition to perform an action, the voice managing server operable to
  receive the voice command,
  identify a first action intended word from the voice command,
  assign a confidence score to the first action intended word,
  alter the confidence score of the first action intended word in a temporal manner, based on confidence scores of second action intended words following the first action intended word in the voice command,
  identify the action when the confidence scores of the first and second action intended words exceed a pre-determined confidence score associated therewith, and
  perform the identified action by the voice-controlled device.

Embodiments of the present disclosure substantially eliminate or at least partially address the aforementioned problems in the prior art, and enable processing the streaming voice command word-by-word to achieve a faster action corresponding to the voice command that is not achieved by conventional voice-activated devices. Such efficient analysis of the voice command enables a real-time automation system for performing a desired action. The term voice command in this description refers to a streaming type voice command, wherein the voice command is received as a streaming type information (i.e as a data stream). The streaming type information (aka streaming voice command or voice command) is analyzed as it is received. Indeed based on the embodiments the voice command analysis is performed word per word (or partial word per partial word) basis as the voice command are spoken and received.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
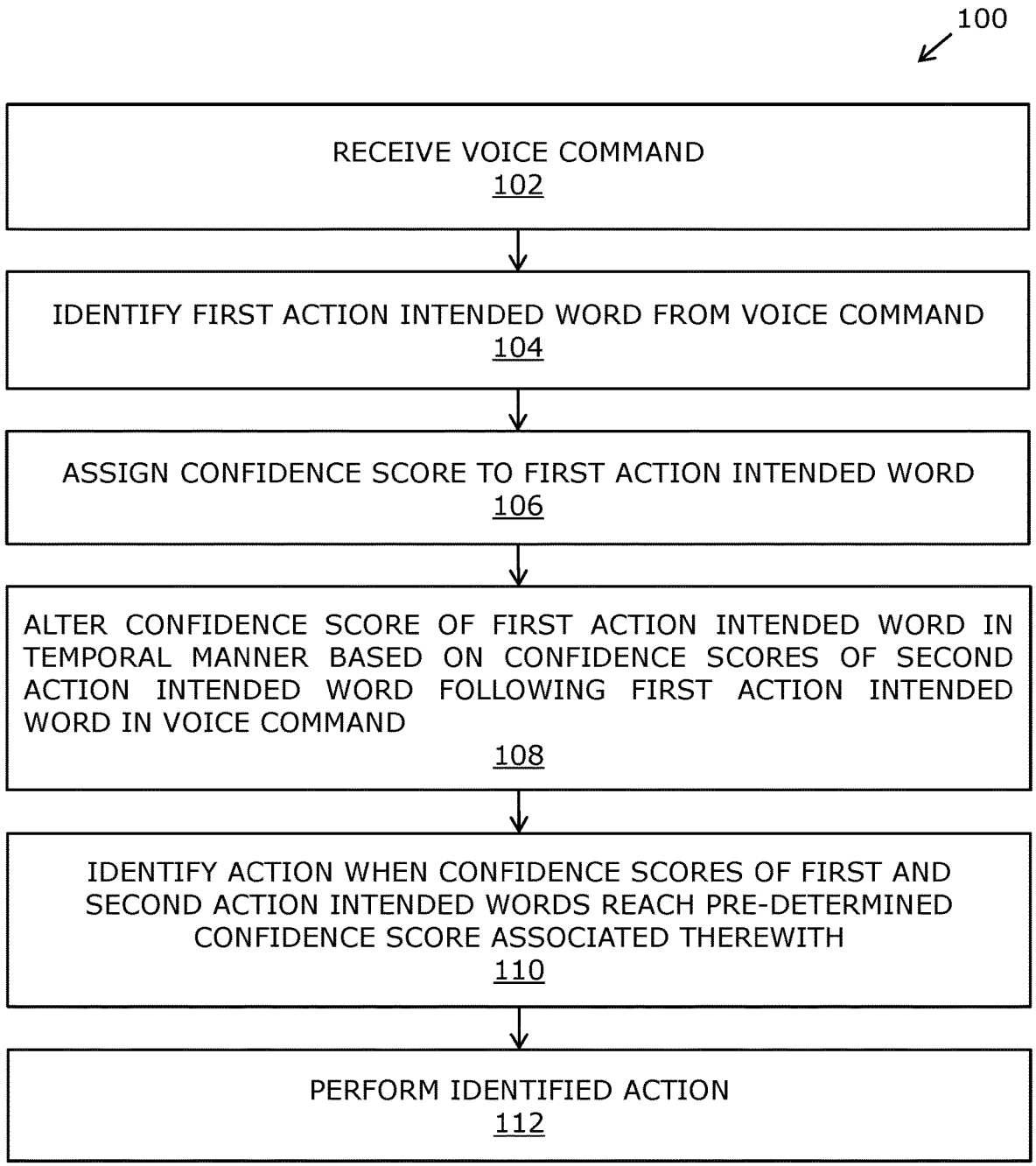
FIG. 1 is a schematic illustration of a flowchart illustrating steps of a method for voice recognition to perform an action, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a method for voice recognition to perform an action, the method comprising:
receiving a voice command,
identifying a first action intended word from the voice command,
assigning a confidence score to the first action intended word,
altering the confidence score of the first action intended word in a temporal manner, based on confidence scores of second action intended words following the first action intended word in the voice command,
identifying the action when the confidence scores of the first and second action intended words reach a pre-determined confidence score associated therewith, and
performing the identified action.

In another aspect, an embodiment of the present disclosure provides a system for voice recognition to perform an action, the system comprising:
one or more voice-controlled devices, and
a voice managing server communicably coupled to the one or more voice-controlled devices, the voice managing server operable to
receive a voice command,
identify a first action intended word from the voice command,
assign a confidence score to the first action intended word,
alter the confidence score of the first action intended word in a temporal manner, based on confidence scores of second action intended words following the first action intended word in the voice command,
identify the action when the confidence scores of the first and second action intended words exceed a pre-determined confidence score associated therewith, and
perform the identified action associated with one or more voice-controlled devices.

In yet another aspect, an embodiment of the present disclosure provides a voice managing server for voice recognition to perform an action, the voice managing server operable to
receive the voice command,
identify a first action intended word from the voice command,
assign a confidence score to the first action intended word,
alter the confidence score of the first action intended word in a temporal manner, based on confidence scores of second action intended words following the first action intended word in the voice command,
identify the action when the confidence scores of the first and second action intended words exceed a pre-determined confidence score associated therewith, and
perform the identified action by the voice-controlled device.

The present disclosure provides the aforesaid method, system and voice managing server for voice recognition to perform an action. The method enables receiving voice commands and analysing said voice commands for identifying a desired action to be performed. Moreover, the method enables analysing, in real-time, as the voice command is spoken (i.e. stream of voice command) by the user. The real-time analysis enables processing the streaming voice command word-by-word to achieve a faster action corresponding to the voice command. Furthermore, the method enables reduction in the time gap between the voice command and performing the action associated therewith. Additionally, the voice command is analyzed based on a vocabulary database, and each word spoken to form the voice command is assigned a confidence score to identify a class to which each word belongs to. Such classification of the voice command results in an unambiguous understanding of the natural language voice command and its efficient and effective conversion into machine-readable format. Beneficially, the aforesaid method, system and voice managing server provide a robust, time-efficient and user-friendly control of the voice-activated devices.

Pursuant to the embodiments of the present disclosure, provided is a method and system for voice recognition to perform an action associated with the said voice or voice command. The term "system" as used herein refers to an arrangement of one or more devices or apparatuses that function collectively to realize a desired action, in this case an action associated with the voice command. The term "voice recognition" as used herein refers to a process of understanding the voice command as spoken by a user in their natural language and converting it into a machine-readable format using suitable natural language processing techniques. Optionally, the voice commands are recognized by a voice recognition software associated with the user device for performing the desired action. Notably, the voice recognition software translates the voice command, as spoken in natural language, into a machine language format. Optionally, the user may be a human being or a virtual program (such as, an autonomous program or a bot) operating the aforementioned system. The term "action" as used herein refers to a task intended by the voice command to be performed by specific one or more voice-controlled devices. Notably, the action is performed by the specific one or more voice-controlled devices pursuant to minimum efforts by the user.

The method comprises receiving the voice command. The term "voice command" as used herein refers to an instruction relayed from the user to perform the action associated with the said voice command. It will be appreciated that the voice commands are naturally spoken word(s) or phrases, or alternatively non-verbal sounds (such as humming, voice gestures, and the like) relayed from the user of the user-interface as an instruction to the user device or software to perform the desired task. Normally, the voice command comprises one or more words for describing the system to initiate and/or perform the action. Optionally, the one or more words may form a phrase or a sentence indicative of how to perform the action.

Typically, the voice command is received via a microphone associated with a user device (namely, electronic or computing device). Notably, the microphone is a specialized component of the user device configured to receive sound waves as input, and convert the received sound waves into electrical energy (or signals) for desired amplification, transmission and recording. It will be appreciated that the microphone serves as a user-interface of the user device. Optionally, the user device may comprise more than one microphones.

Moreover, the method comprises identifying a first action intended word from the voice command. As mentioned before, the voice command comprises one or more words intended for initiating and/or performing the action. Specifically, each of the one or more words is descriptive of the intended action. Notably, the intent is a manner by which an input instruction, i.e. voice command, produces the desired operation output, i.e. the action required to be performed. Specifically, the intent of the voice command refers to intention or meaning of the user suggested by the voice command of the user. More specifically, each of the one or more words is an action intended word. The term "action intended word" as used herein refers to a single word or a part of a phrase that is uttered aiming to achieve a desired result, such as performing the action intended by the said one or more words. Optionally, the action intended words may comprise at least one entity and one or more entity parameter associated with the entity. The term "entity" as used herein refers to a single, identifiable, separate object. The entity is associated with one or more entity parameters that enable identification of a given entity. For example, if the voice command is "Switch off light in kitchen", the entities are "light" and "kitchen", and entity parameters are "Switch" and "off". Optionally, the action intended words may be categorized in different classes, as discussed below in detail. Optionally, the entity modifies the intent of the voice command.

Throughout the present disclosure, the term "first action intended word" as used herein refers to an opening word or expression in the course of action intended to perform the desired action. Herein, the first action intent word is related to initiating the intended action. It will be appreciated that the first action intended word and the one or more words following the first action intended word, such as second action intended words, form an abstract description of the action to be performed pursuant to the voice command. Therefore, the term "second action intended words" as used herein refers to one or more words or expressions in continuation of the first action intended word in the course of action intended to perform the desired action. It will be appreciated that the term "second" is only indicative of a continuation expression. In such case, the second action intended words may collectively include a second, third, fourth, fifth, sixth, seventh word, and so on. Notably, the first and second action intended words forming the voice command are different from each other in terms of the information suggested thereby. For example, if the user utters "Switch off light in kitchen", the user intent is to have the kitchen to be darkened by switching off the light therein. Consequent to the voice recognition and extraction of intent of the voice command, the system is operable to perform the action intended, i.e. switching off the light(s) in the kitchen. In the said example, the word "Switch" is the first action intended word suggestive of the desired action, i.e. accessing a physical switch or switching something to be ON or OFF, for example. Moreover, the word "off", following the word "Switch", is a second word forming the second action intended words, suggestive of the desired action, i.e. switching off, for example an electronic or electrical component operable by a switch. Similarly, the words "light" and "in kitchen" are third and fourth words forming the second action intended words, respectively, suggestive of a further action, i.e. turning off the switch associated with the light in the kitchen. It will be appreciated that the streaming voice command comprising the first and second action intended words are received as a function of time.

Moreover, the method comprises assigning a confidence score to the first action intended word. The term "confidence score" as used herein refers to a quantifier representative of a confidence in the result provided by the aforesaid method and/or system based on the interpretation of the action intended words forming the voice command. Specifically, the confidence score is generated based on a receiving (namely, hearing) of the streaming voice command by the system. More specifically, the first action intended word is received first by the system and is processed with a confidence score estimation module associated with the system. The confidence that score is typically a number represented as a fraction of numbers, a decimal number, a percentage, and so forth. For example, for a certain voice command, the system can have a confidence score of 1.0 that the result is correct, or a confidence score of 0.5 that the probability of the result being correct is 50%. In an example, for a voice command, such as "Switch off light in kitchen", a confidence score of 0.85 may be associated with the word "light" and a confidence score of 0.55 may be associated with the word "flight". Typically, a higher confidence score is associated with a greater level of confidence in correctness of the result provided by the system corresponding to the voice command. As a result, higher confidence score contributes more to the correct hearing and analysis of each of the action intended words forming the voice command. Optionally, the intent of the voice command is extracted based on an ontology data accessible by the system. In this regard, the confidence score is calculated for each of the first and second action intended words based on the ontology data.

Moreover, the method assigns confidence score to each of the action intended words forming the voice command, such as the first and second action intended words, based on a perception of the said first and/or second action intended words by the system. Optionally, the confidence score is calculated based on number of parameters, such as a vocabulary, an utterance, a lexicon, a part of speech, a label, and so forth, associated with the voice command. Specifically, assigning confidence score to the first action intended word or the second action intended words is based on the lexicon, vocabulary, part of speech, and so forth associated with the first or the second action intended word of the streaming voice command. Moreover, assigning confidence score to the second action intended words may be based on the first action intended word, lexicon, vocabulary, part of speech, and so forth associated with the first action intended word of the streaming voice command.

The vocabulary is a list of words in a database to which a speech engine compares an utterance of voice command against. The vocabulary is made up of all the words in all active grammars. The term "utterance" as used herein refers to an uninterrupted chain of spoken language, preferably in natural language. The utterance is a natural, complete unit of speech bounded by the speaker's silence, most commonly breaths or other pauses. The term "lexicon" as used herein refers to a list of words with pronunciations. For a speech recognizer, lexicon includes all words known by the system, where each word has one or more pronunciations with associated probability values. The part of speech is a category of words (or, more generally, of lexical items) that have similar grammatical properties. The eight parts of speech in English are noun, pronoun, verb, adjective, adverb, preposition, conjunction, and interjection, for example. Words that are assigned to the same part of speech generally display similar syntactic behavior, they play similar roles within the grammatical structure of sentences, and sometimes similar morphology in that they undergo inflection for similar properties. The term "label" as used herein refers to the output of the system. It will be appreciated that the system is initiated based on utterance of a wake word associated with the system. The wake word is a word or phrase that stimulates a personal assistant device. Familiar examples of wake words include "OK Google", "Hey Alexa", "Hi Siri", and so on. The wake word is needed to distinct actual voice commands meant to be processed by the system from normal, human-to-human speech.

Optionally, assigning the confidence score to the first and second action intended words comprises assigning one or more probability values of belonging to one or more classes of a plurality of classes. The term "class" as used herein refers to category to which the first and second action intended words belong to. The first and second action intended action words may be associated with one or more classes of a plurality of classes is based on similarity or other defined characteristics. Optionally, the plurality of classes may be determined based on parts of speech, vocabulary, lexicon, and so forth. Notably, the first and second action intended words may belong to more than one class. For example, the word "Switch" may be a physical switch (noun) or an action (verb), i.e. action for modifying a state of an entity, such as an electrical component or device, for example.

Optionally, the plurality of classes are defined based on the intent of the voice command. Notably, the intent of the voice command is suggestive of the action to be performed. Moreover, the intent of the voice command may be suggestive of the plurality of classes, one or more of which the first and second action intended words belong to. In the aforementioned example, the intent, i.e. to have the kitchen to be darkened by switching off the light therein, is used to categorize the first and second action intended words into suitable one or more classes. The intent of the voice command enables associating more clarity with the first and second action intended word to belong to one or more classes of the plurality of classes. Therefore, consequent to the voice recognition and extraction of intent of the voice command, the system is operable to categorize the first and second action intended words in suitable one or more classes of the plurality of classes.

Optionally, the plurality of classes comprises an action class, a parameter class, a subject class and a target class. The term "action class" as used herein refers to a category suggestive of a desired operation or task associated with the desired action to be performed pursuant to the voice command. The term "parameter class" as used herein refers to a supporting verb associated with the action class. The parameter class is suggestive of the desired modification intended by the voice command. The term "subject class" as used herein refers to an entity using which the said intent of the voice command is realized. The term "target class" as used herein refers to a desired site where the desired action is required to be performed. The method broadly categorizes each of the first and second action intended words into the action class, the parameter class, the subject class, and the target class, based on the intent of the voice command. For example, the stream of voice command "Switch off light in kitchen" comprises the first and second action intended words, "Switch", "off", "light" and "in kitchen", wherein the word "Switch" is the first action intended word and the words "off", "light" and "in kitchen" are the second action intended words. In this case, the word "Switch" belongs to the action class, the word "off" belongs to the parameter class, the word "light" belongs to the subject class, the word "in kitchen" belongs to the target class.

Moreover, each of the one or more classes of the plurality of classes are associated with a probability value, therefore, the probability values are assigned to the first and second action intended words belonging to the one or more classes of the plurality of classes. Similar, to the confidence score, the probability value is typically a number, represented as a fraction of numbers, a decimal number, a percentage, and so forth. For example, the probability value of 1.0 means a best probability of association and a probability value of 0.5 means only a 50% probability of association of a given word with a desired characteristic. Optionally, the first and second action intended words are assigned an initial probability depending upon distribution of the first and second action intended words in the voice command and the one or more classes to which the first and second action intended words belong to. In an example, the initial probability associated with the one or more classes to which the first and second action intended words belong to may be action class probability (p_a) of 0.25, parameter class probability (p_p) of 0.25, subject class probability (p_s) of 0.25 and target class probability (p_t) of 0.25. Optionally, the probability values are assigned based on either rules or historical statistics of meaning contained by the first and second action intended words. Moreover, the probability values of each of the first and second action intended words can have impact on the others in an iterative manner.

In the aforementioned example, the first action intended word "Switch" is received first by the system and is assigned a probability value of 0.5 that the first action intended word "Switch" belongs to the action class (p_a=0.5). Notably, the word "Switch" can be something else, a physical switch for example, with a probability value of 1−p. Subsequently, the second action intended words, i.e. "off", "light" and "in kitchen" are received and analyzed to be belonging to the parameter class, the subject class, and the target class respectively, and corresponding probability values are assigned thereto. Moreover, the words "Switch" and "off" are closely related and when uttered together suggest turning off or closing something. Therefore, the probability value of 1.0 is assigned to the word "off" after being analyzed to be the parameter class associated with the action class "Switch". Based on the probability value of a part of the second action intended words, i.e. "off", the probability value of the first action intended word is changed, by way of increasing, to a new probability value of 0.8 (new p_a=0.8). Moreover, the probability value of the action class "Switch" may be further altered from 0.8 to 1.0 based on the other second action intended words uttered subsequently.

Subsequently, another part of the second action intended words, i.e. "light", is received and analyzed to be belonging to the subject class. The word "light" further clarifies that the word "Switch" is an action since light can be switched OFF/ON pursuant to the voice command. At this point, the word "light" may be classified as the subject or the target and thus may be assigned a probability value of 0.7 associated with the subject class or a probability value of 0.3 associated with the target class. Based on the received second action intended words "off" and "light", the probability value of the word "Switch" is altered from 0.8 to 1.0 and the probability value of the word "off" is unaltered and remains 1.0. Similarly, the rest of the part of the second action intended words, i.e. "in kitchen", is received and analyzed to be belonging to the target class. The word "in kitchen" suggestive of a target site or location where the said action, suggested by the terms "Switch", "off" and "light", is to be performed. Therefore, based on the received second action intended words "off", "light" and "in kitchen", the probability value of the word "Switch" is determined to be 1.0, the probability value of the word "off" is determined to be 1.0, the probability value of the word "light" is altered from 0.7 to 1.0, and a probability value of 1.0 is assigned to the word "in kitchen". In this regard, the probability values of the first action intended word and/or the second action intended words are suitably modified to achieve the probability of 1.0 for each of the first and second action intended words.

It will be appreciated that upon achieving a probability value of 1.0 for each of the first and second action intended words, the confidence score of the first and second action intended words is also assigned thereto. The confidence score of the first and second action intended words enables the system to generate viable results with higher confidence. In an example, a confidence score of 1.0 may be assigned to the first action intended word once the probability value of 1.0 is assigned to the said first action intended word belonging to at least one of the plurality of classes, such as the action class as determined in the above example. Similarly, the confidence scores of 1.0 may be assigned to the each of the second action intended words once the probability value of 1.0 is assigned to the each of the said second action intended words belonging to at least one of the plurality of classes, such as the parameter class, subject class, and target class, as determined in the above example. In such case, the confidence score of 1.0 assigned to the first and second action intended words is associated with the correctness of the voice command and an intent thereof, and thus enables performing the desired action associated with the voice command.

Furthermore, the method comprises altering the confidence score of the first action intended word in a temporal manner, based on confidence scores of second action intended words following the first action intended word in the voice command. The term "temporal manner" as used herein refers to a temporary association of a confidence score with the first action intended word. Temporal manner relates to a limited period of time for which the aforesaid association between the confidence score and the first action intended word exists. Optionally, the temporal manner is associated with a time period defined with a start time and an end time of the voice command. As mentioned above, the streaming voice command comprising the first and second action intended words are received as a function of time. The term "time period" as used herein refers to the total duration required for the complete voice command to be received and/or for performing the desired action pursuant thereto. More optionally, the time period includes a plurality of moments of time associated with the first and second action intended words identified in the voice command. The first and second action intended words are received at different moments of time, referred to as the plurality of moments of time for receiving the first and second action intended words. Moreover, the term "plurality of moment of time" as used herein refers to a time point, such as the first, second, third, fourth moments of time, and so on, at which the voice command comprising the first and second action intended words, are received. Notably, the first and second moments of time may be spaced by same or different durations therebetween. Moreover, the subsequent moments of time are also same or different. Notably, the plurality of moments of time appear in a chronological order, wherein the second moment of time occurs subsequent to the first moment of time, and the third moment of time occurs subsequent to the second moment of time, and so on.

The confidence score of the first action intended word may be altered (by means of improving) every time the second action intended words are received and processed (for example, analysed) by the system. It will be appreciated that the utterance of the second action intended words provides more support and clarity to the first action intended word, therefore enables associating a better confidence score to the first action intended word as well as the second action intended words by altering the previously assigned value of confidence score of the given first or second action intended word, respectively.

Optionally, the method further comprises altering the confidence score of the second action intended words. It will be appreciated that confidence scores of one or more second action intended words are altered based on the first action intended word and/or other second action intended words. As mentioned in the above example, subsequent to receiving and analysing the second action intended words, the confidence score of the first action intended word is altered.

Similarly, the confidence score of at least a part of the second action intended words, i.e. the second action intended word uttered just after the first action intended word, is altered based on a relation thereof with the first action intended word. Moreover, the confidence score of at least a part of the second action intended words, i.e. the second action intended word uttered just after the first action intended word, is altered based on at least one of: the subsequent second action intended words uttered after the second action intended word uttered just after the first action intended word, a relation thereof with the second action intended word uttered just after the first action intended word, and the relation between the second action intended words and the first action intended word.

Optionally, altering the confidence score of the first and second action intended words comprises altering the one or more probability values of the first and second action intended words in the temporal manner. In this regard, it will be appreciated that the association of the first and second action intended words with one or more classes of the plurality of classes and assigning suitable probability values to the first and second action intended words belonging to the one or more classes of the plurality of classes enables modifying (namely, altering) the confidence scores assigned to the first and second action intended words. In other words, the probability scores of 1.0 for each of the first and second action intended words belonging to the action class, the parameter class, the subject class or the target class enables assigning higher confidence score to the result generated by the system.

Optionally, the altered one or more probability values allow the confidence scores to reach the pre-determined confidence score when each of the first and second action intended words belong to one class of the plurality of classes. It will be appreciated that the confidence score is associated with a higher probability of returning a correct result by the system if the said confidence score is above a pre-determined confidence score (namely, confidence threshold). The term "pre-determined confidence score" as used herein refers to a threshold value below which the system results are ignored. In this regard, if the pre-determined confidence score is set to 0.6, then the results having confidence score below 0.6 are ignored by the system. In an example, for the above-mentioned voice command "Switch off light in kitchen", the system may read (namely, analyze) the voice command as "Switch "of flight" in kitchen" or "Switch "off light" in kitchen". In such case, pursuant to analysis of the first and second action intended words, the system may assign a confidence score of 0.85 to the word "light" and a confidence score of 0.55 to the word "flight". Since the pre-determined confidence score is set to 0.6, therefore, the word "flight" would not be considered to be a system-generated result due to the confidence score of 0.55 associated therewith. Beneficially, the pre-determined confidence score prevents the system from generating improbable results for any given audio input.

Typically, a higher confidence score is associated with a greater level of confidence in correctness of the result provided by the system corresponding to the voice command. As a result, higher confidence score contributes more to the correct hearing and analysis of each of the action intended words forming the voice command. Optionally, the intent of the voice command is extracted based on an ontology data accessible by the system. In this regard, the confidence score is calculated for each of the first and second action intended words based on the ontology data.

Optionally, the receiving and processing or analysing of the voice command is performed in real-time. Moreover, the term "real-time" as used herein refers to a microsecond-level processing time. However, it will be appreciated that the processing speed of the voice command may not unduly limit the possibility of other processing speeds, such as nano- or millisecond level, associated with the voice commands based on length and framing of the said voice command. Alternatively, the received voice command is processed from stored (or pre-recorded) files, such as those created in the recent past or saved in particular.

Furthermore, the method comprises identifying the action when the confidence scores of the first and second action intended words reach a pre-determined confidence score associated therewith, and performing the identified action. The action is identified based on the intent of the voice command, i.e. extracted from the meaning carried by the first and second action intended words. Specifically, the action is identified based on the confidence scores of the first and second action intended words. More specifically, the action is identified from the first and second action intended words confidence scores of which exceed a pre-determined confidence score. In this regard, the identified action is related to a correct understanding of the voice command, and therefore highly likely is a correct action associated with the voice command. The system provides information associated with the identified action to the specific one or more voice-controlled devices configured to perform the identified action. In an example, the voice command is received and when the confidence score of the first and second voice commands is higher than the pre-determined confidence score then the associated action is executed.

Optionally, performing the identified action comprises operating functions of a voice-controlled device. The voice-controlled device is operable to modulate settings thereof to realize the identified action. Notably, the natural language processing of the voice command into the machine readable format understandable by the voice-controlled device is provided by a processing arrangement of the system to the voice-controlled device to perform the identified function.

The present disclosure also relates to the system as described above. Various embodiments and variants disclosed above apply mutatis mutandis to the system.

The system comprises one or more voice-controlled devices and a voice managing server communicably coupled to the one or more voice-controlled devices. The voice managing server is operable to perform the aforementioned method with one or more voice-controlled devices.

Throughout the present disclosure, the term "voice-controlled device" as used herein refers to an electronic device that is capable of performing actions intended by the voice commands. Optionally, the one or more voice-controlled device include a display, a microphone, an audio piece, a camera, a memory, a processing arrangement, a user-interface (namely, communication interface), and other components. Moreover, the voice-controlled device is configured to host one or more application programming interfaces thereon to support and/or enable the operation of an associated system. Furthermore, the voice-controlled device is intended to be broadly interpreted to include any electronic device that may be used for voice and/or data communication over a wired or wireless communication network. Examples of voice-controlled device include, but are not limited to, a user device (discussed below), an electro-mechanical device, an electronic component, a home appliance, and the like. Examples of the communication network include, but are not limited to, a cellular network, a shortrange radio (for example, such as Bluetooth®) network, Internet, a wireless local area network, and an Infrared Local Area Network, or any combination thereof.

Throughout the present disclosure, the term "voice managing server" as used herein refers to the server associated with a voice management system. The voice managing server may be an arrangement of physical or virtual computational entities such as a processing arrangement, and a memory unit that includes programmable components configured to store, process and/or share information. It will be appreciated that the voice managing server may be a single hardware server or a plurality of hardware servers operating in a parallel or distributed architecture.

The voice management system may typically be implemented as a speech recognition system. The voice managing server is communicably coupled to the one or more voice-controlled devices. The voice managing server processes the voice commands received via a user device and provides the processed information to the voice-controlled devices and or the user device. It will be appreciated that the voice managing server processes information as received in real-time. Moreover, the processed information is provided to the user device in real-time. It will be appreciated that the voice managing server enables processing the voice commands from natural language to a formatted machine-readable language, and the said formatted machine-readable language is subsequently provided to the machine associated with the voice managing server, for executing the instructions corresponding to the received first and second voice commands.

Optionally, the voice managing server is configured for receiving the voice command and speech adaptation, i.e. categorizing spoken words or numbers into different classes, such as action class, parameter class, subject class, and target class. Moreover, the voice managing server is configured to provide voice-to-text conversion of the voice commands in a format understandable by the one or more voice-controlled devices. In this regard, automatic speech recognition, natural language processing and artificial intelligence operations may be involved in transforming (namely, transcribing) the voice commands into text by semantic interpretation of the voice commands. Furthermore, the voice managing server is configured for noise robustness by cancelling out noise from environment while processing the voice commands. Additionally, the voice managing server is configured for multilingual scenarios.

Optionally, the voice managing server is operable to assign and alter the confidence score based on the information related to the one or more voice-controlled devices. In this regard, the voice managing server analyses the received voice command to identify the first and second action intended words by the natural language processing module associated with the voice managing server. A confidence score estimation module is associated with the voice managing server. The confidence score estimation module processes the streaming voice command and assigns probability values and confidence scores to the first and second action intended words forming the voice command. For example, for a certain voice command, the voice managing server can assign a confidence score of 1.0 to the voice command if the result is about 100% correct. Typically, a higher confidence score is associated with a greater level of confidence in correctness of the result provided by the voice managing server corresponding to the voice command. Moreover, the voice managing server is operable to alter the assigned probability value and the confidence scores based on more clarity around the meaning carried by each of the first and second action intended words. As mentioned above, altering the confidence score further comprises altering the probability values of the first and second action intended words.

Optionally, the voice managing server employs one or more neural network, rule-based or Boolean-based algorithms for assigning and altering the confidence score of the first and second action intended words. The confidence scores are adjusted based on either rules or historical statistics of meaning contained by each of the first and second action intended words. Optionally, the voice command is fed to a long-term short-term (LTST) type of neural network or a recurrent neural network (RNN) as voice command or as text after voice-to-text conversion. The neural network is used to determine the confidence scores associated with the first and second action intended words forming the voice command, based on for example the probability values associated with the one or more classes of the plurality of classes to which each of the first and second action intended words belongs to, when the voice command is received by the neural network.

Optionally, the neural network may be implemented as a backward propagating neural network. In such case, the confidence scores associated with the first and second action intended words vary as the streaming voice command is received. In this regard, the neural network compares the confidence scores assigned to the first and second action intended words with the pre-determined confidence score. In case the confidence scores associated with the first and second action intended words reaches or is higher than the pre-determined confidence score, then the voice managing server commands the one or more voice-controlled devices to perform the desired action.

Moreover, the voice managing server is operable to perform the identified action by the voice-controlled device. It will be appreciated that the one or more voice-controlled devices are any of electrical, electronic or electro-mechanical components or appliances, operable to perform specific functions defined thereby. Specifically, the voice managing server provides instructions to the specific voice-controlled device to perform the action associated with the voice command received and processed by the voice managing server. In an example, if the voice command "Switch off light in kitchen" requires that light in the kitchen to be turned off, then the power controls associated with the voice-controlled device, such as for example the lighting arrangement in the kitchen, is operated to turn said light off.

Optionally, the system further comprises a user device, communicably coupled to the voice-controlled device and the voice managing server, for providing the voice command to the voice managing server. Throughout the present disclosure, the term "user device" as used herein refers to an electronic device associated with (or used by) the user that is capable of enabling the user to provide voice commands. Optionally, the user device includes a display, a user-interface (communication interface), a microphone, an audio piece, a memory, a processing arrangement, a camera, and other components. The user device may include, but not limit to cellular phones, smartphones, personal digital assistants (PDAs), handheld devices, laptop computers, personal computers, tablet computers, desktop computers, extended reality (XR) headsets, XR glasses, televisions, and the like. Moreover, the user device is configured to host one or more application programming interfaces thereon to support and/or enable the operation of an associated system. Furthermore, the user device is intended to be broadly interpreted to include any electronic device that may be used for voice and/or data communication over a wired or wireless communication network.

Optionally, the user device comprises a microphone for receiving voice commands and a display for displaying information, such as for example text or images, when the user device is in operation. Optionally, the microphone receives voice commands as inputs, such as via the microphone of the user device, and provides text, visual or auditory output, via a display control panel or the audio piece of the user device. Moreover, the user device provides hands-free experience. Hands-free use of the user device allows users to interact with the voice-controlled device or software applications in an effective, efficient, convenient, intuitive and user-friendly manner, to produce the desired result.

Optionally, the user device comprises a voice-to-text converting module. The term "voice-to-text converting module" as used herein refers to a software program comprising a set of instructions for performing speech recognition and translating spoken languages into text. The voice-to-text converting module are typically based on Hidden Markov Model (HMM), deep neural network models, and the like, to convert the voice into text. Normally, the voice-to-text converting module employ an acoustic modelling algorithm, a language modelling algorithm, and, optionally, a pronunciation modelling algorithm for speech recognition. Optionally, the voice-to-text converting module follows a supervised learning or unsupervised learning approaches for speech recognition. Optionally, the voice-to-text converting module is implemented within the user device or is communicably coupled to the user device as a separate system.

Optionally, the voice-controlled device may be configured to perform some or all of the operations (namely, actions) internally or using a server system coupled thereto via the communication network. More optionally, the amount of actions performed by the voice-controlled device internally or by the server system associated therewith can be also dynamically vary. In an example, the voice command can be analysed and resulting actions are performed by the voice-controlled device independently. Alternatively, the voice commands can be analysed by the server system associated with the voice-controlled device that receives voice commands.

Optionally, the system further comprises one or more databases, communicably coupled to the voice managing server, having information related to the one or more voice-controlled devices. The one or more databases are operable to store the information related to the desired action performed using the aforementioned method by the aforementioned system. Typically, the one or more databases store information related to the voice commands, first and second action intended words, probability values assigned to the first and second action intended words, the confidence scores assigned to first and second action intended words, and the one or more voice-controlled devices. Specifically, the one or more databases have information regarding the operational parameters of the one or more voice-controlled devices and the actuation mechanisms thereof. The one or more databases have information related to wattage or voltage, mode of operation, duration of operation, operation temperature, and so on related to the one or more voice-controlled devices, for example. Optionally, the one or more database having information related to the one or more voice-controlled devices is communicably coupled with the one or more voice-controlled devices via the voice managing server and/or via the user device, or any other arrangement to be able to control the one or more voice-controlled devices.

In an example, when calculating the probability values and/or the confidence scores for a voice command "Switch off light in kitchen", the system can be connected to the one or more databases having information related to the one or more voice-controlled devices, such as for example a list of home appliances. In such case, the one or more databases can comprise status of the one or more voice-controlled devices or home appliances. If at least one of the voice-controlled devices is a light then that information can be further used to adjust the probability value of the first and second action intended words belonging to one or more classes of the plurality of classes, action class, parameter class, subject class, and target class. If at least one light is "ON" then turning "OFF" light makes sense and the probability value associated with the first and second action intended words can be altered suitably. Moreover, the word "kitchen" completes the probability value estimation to committing to action of "Switch" to mean switch off light in the kitchen. Furthermore, the probability value can be adjusted by comparing the one or more databases listing the information related to the one or more voice-controlled devices.

In an exemplary implementation, the aforementioned method and system is employed for controlling home appliances in a smart home (or office or any other indoor or outdoor setting). Alternatively, time-based adjustment of probability values may also be achieved for any other applications such as web applications, for example creating a shopping list by adding items to a shopping list of a web application. For instance, if the voice command for creating a shopping list is "I want to buy bananas", then the probability value of each word of the voice command evolves over time and after reaching a pre-determined value, the action associated with the voice command is performed, i.e. adding "Bananas" to the shopping list. In this example, the voice command is associated with the web application and list of possibilities of what could be added or removed is maintained in database associated with the web application. The term "web application" is a service provider, such as a shopping website. Typically, the service provider may be for example an online seller, a food joint, a grocery store, a departmental store, and so forth. Optionally, a server associated with the service provider is coupled in communication with the user device via a communication network. The server of the service provider provides information related to the plurality of entities to the user of the apparatus. Optionally, the web application program interface is downloadable from a software application store, for example, such as an "App store" of the user device.

It will be appreciated that a person skilled in the art will recognize that voice-controlled devices and voice managing servers are beneficial in multitasking productivity in indoor spaces (such as office spaces, smart homes, smartphones, smart watches, automobiles, domotics (home automation, for example smart light fixtures, thermostats, smart locks, and so forth), computers, home appliances (for example, owens, fridges, washing-machines), and other Internet of Things (IoT)) or outdoor spaces (such as construction sites, oil refineries, driving, and so on), and the aforementioned exemplary implementation does not unduly limit the scope of the claims.

According to one embodiment the voice command is received as a streaming audio and the first action intended word is identified from the streaming audio before the words following the first action intended words are received in the same stream. This way a method and system can be implemented in which the voice commands are received using standard streaming technologies developed for normal voice communication. This makes system design aspects easier as there is no need to buffer voice inputs in a device and it also increases security as the voice inputs do not need to stored locally nor in the voice managing server. Indeed according to an embodiment the voice command is a streaming voice command. As a further example, according to an embodiment a voice managing server is configured to receive the voice command as a voice stream and the second action intended words following the first action intended word are received in the same voice stream temporarily after the first action intended word. In other words the first action intended word is spoken first and the second action intended words are spoken after the first actin intended word. As the system is configured to analyse received voice stream in real time (or near real time) the analysis of overall intent of the spoken voice command can be done before receiving all of the words of the entire command. This makes the voice recognition faster thus intended action can be performed faster.

Example use case: As discussed conventional methods have delays between receiving voice command and performing action. This is particularly a case if the complete voice command has to be first recorded, then transmitted and analysed before a conclusion can be drawn. In said environment for example a voice command: "Turn lights in the kitchen ON" might take several seconds depending on speed of talking and communication speeds. According to disclosure a voice command is received in streaming manner i.e. as it is being spoken. The received voice command "builds up" as it is being received. For example after receiving a first action intended word "Turn lights" a confidence score that it refers to home appliances of lights can be set to the said first action intended word. The confidence score of the first action intended word is altered in a temporal manner as the word in the "in the kitchen" is received. Indeed if the lights in the kitchen are OFF at the moment of receiving word "kitchen" based on information from home automation system the confidence score that the overall action to be performed is to turn lights ON can be determined before the actual spoken word "ON" is received when receiving the voice command. This way the voice controlled system works faster.

DETAILED DESCRIPTION OF THE DRAWINGS

Referring to FIG. 1, there is shown a flowchart 100 illustrating steps of a method for voice recognition to perform an action, in accordance with an embodiment of the present disclosure. At step 102, a voice command is received. At step 104, a first action intended word is identified from the voice command. At step 106, a confidence score is assigned to the first action intended word. At step 108, the confidence score of the first action intended word is altered in a temporal manner, based on confidence scores of second action intended words following the first action intended word in the voice command. At step 110, the action is identified when the confidence scores of the first and second action intended words reach a pre-determined confidence score associated therewith. At step 112, the identified action is performed.

The steps 102, 104, 106, 108, 110 and 112 are only illustrative and other alternatives can also be provided where one or more steps are added, one or more steps are removed, or one or more steps are provided in a different sequence without departing from the scope of the claims herein.

Figure 2:
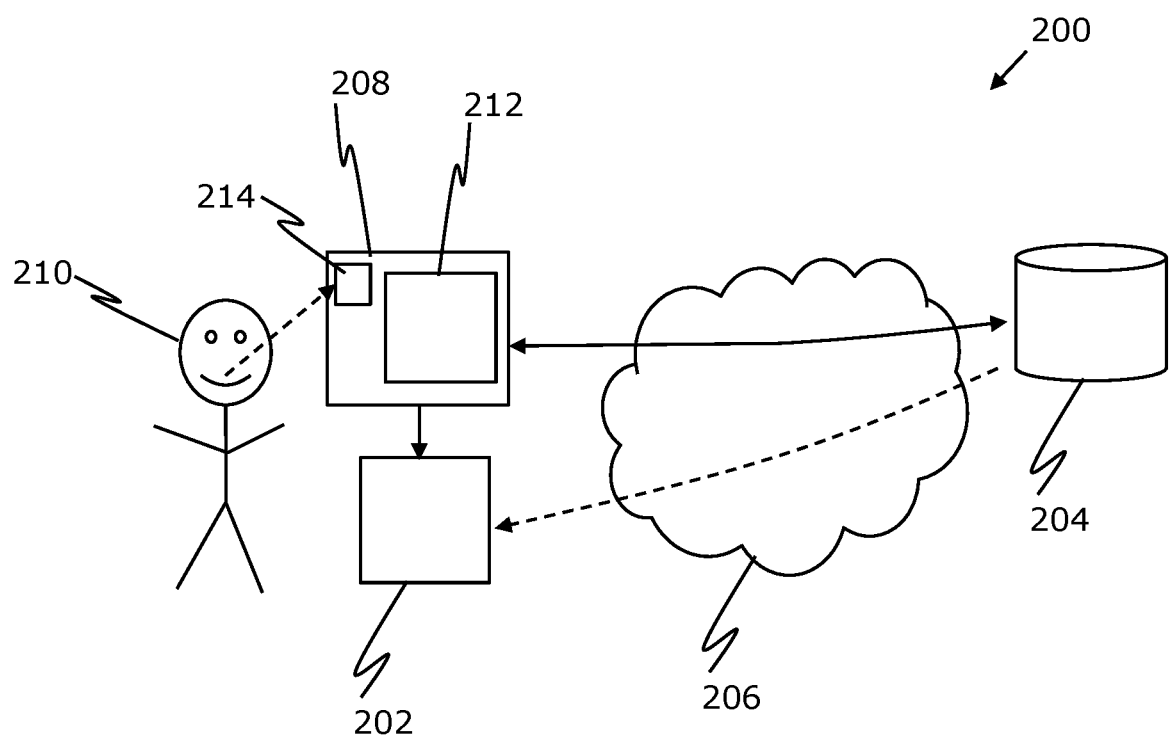
FIG. 2 is a schematic illustration of system for voice recognition to perform an action, in accordance with an embodiment of the present disclosure.

Referring to FIG. 2, illustrated is a schematic illustration of system 200 for voice recognition to perform an action, in accordance with an embodiment of the present disclosure. The system 200 comprises a voice-controlled device 202, and a voice managing server 204 communicably coupled to the voice-controlled device 202. The voice-controlled device 202 and the voice managing server 204 may be communicably coupled over a communication network 206. The voice managing server 204 is operable to receive a voice command, identify a first action intended word from the voice command, assign a confidence score to the first action intended word, alter the confidence score of the first action intended word in a temporal manner, based on confidence scores of second action intended words following the first action intended word in the voice command, identify the action when the confidence scores of the first and second action intended words exceed a pre-determined confidence score associated therewith, and perform the identified action associated with the voice-controlled device 202.

Moreover, the system 200 comprises a user device 208, communicably coupled to the voice-controlled device 202 and the voice managing server 204. The user device 206 is associated with a user 210. The user device 206 is operable to provide the voice command from the user 210 to the voice managing server 204. As shown, the user device 208 comprises a display 212 and a microphone 214.

Figure 3:
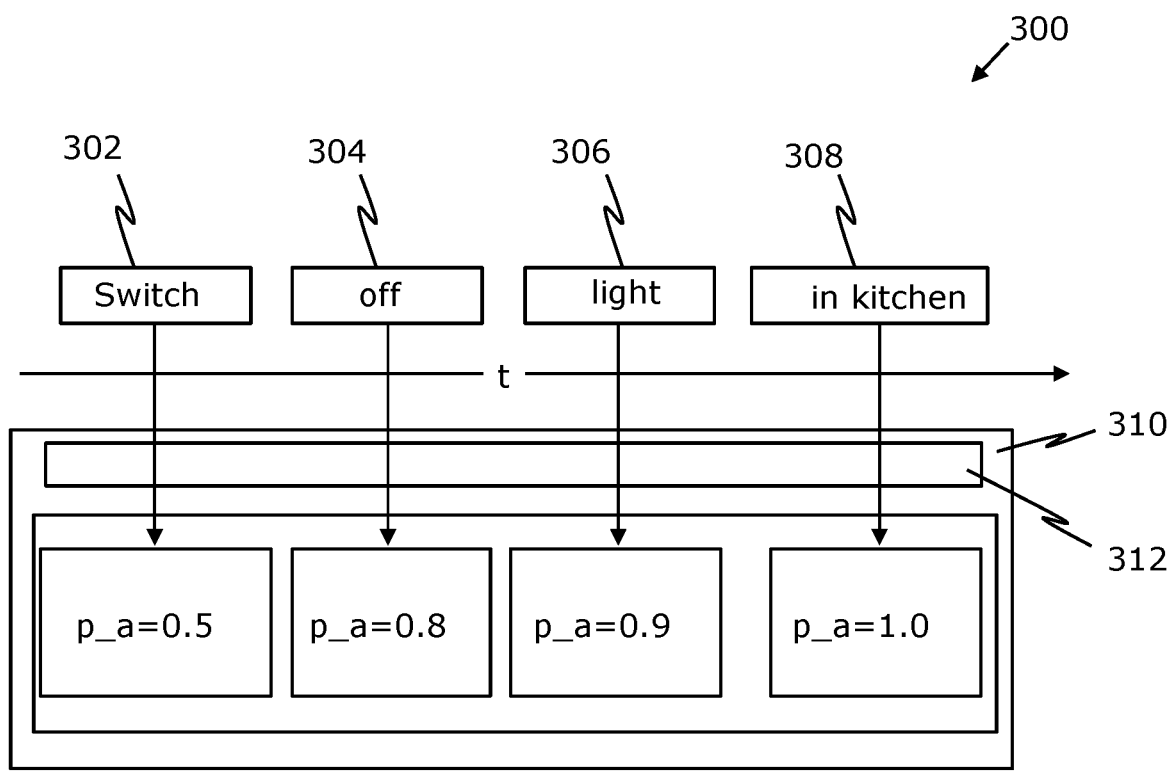
FIG. 3 is a timeline diagram for receiving voice command as a function of time, in accordance with an embodiment of the present disclosure.

Referring to FIG. 3, illustrated is a timeline diagram 300 for receiving voice command as a function of time, in accordance with an embodiment of the present disclosure. As shown, a stream of voice commands consisting of words "Switch" 302, "off" 304, "light" 306, and "in kitchen" 308 is received as a function of time (timeline illustrated as t). The stream of voice command is received by the voice managing server 310 via a user device (such as the user device 208 of FIG. 2). The voice managing server 310 processes the voice command, received in its natural language, to determine the intent of the said voice command, and convert said voice command into machine-readable language. Specifically, the voice managing server 210 comprises a confidence score estimation module 312 operable to process the stream of voice command and assign probability values and confidence scores to the each of the words (302, 304, 306 and 308) of the voice command.

In this regard, at a first time-step, the word "Switch" 302 is received, analyzed, and assigned an initial probability value of 0.5 that the word "Switch" 302 refers to an action class (p_a=0.5). Similarly, at a second time-step, the word "off" 304 is received and analyzed to be belonging to the parameter class and referring to turning something OFF. Therefore, the initial probability value of the word "Switch" 302 is altered and increased to a new probability value of 0.8 (i.e. p_a=0.8). Similarly, at a third time-step, the word "light" 306 is received and analyzed to be belonging to the subject class clarifying that the word "Switch" 302 belongs to the action class since lights can be switched ON or OFF. Therefore, the probability value of the word "Switch" 302 is again altered and increased to a probability value of 0.9 (i.e. p_a=0.9). Similarly, at a fourth time-step, the word "in kitchen" 308 is received and analyzed to be belonging to the target class and completing the probability value estimation for the word "Switch" 302 belongs to the action class since lights in the kitchen needs to be switched OFF. Therefore, the probability value of the word "Switch" 302 is altered and increased to a final probability value of 1.0 (i.e. p_a=1.0). Thus, the intent of the voice command has been determined and the information of the action to be performed is provided to the one or more voice-controlled devices (such as the voice-controlled device 202 of FIG. 2) by the voice managing server 210.

Figure 4:
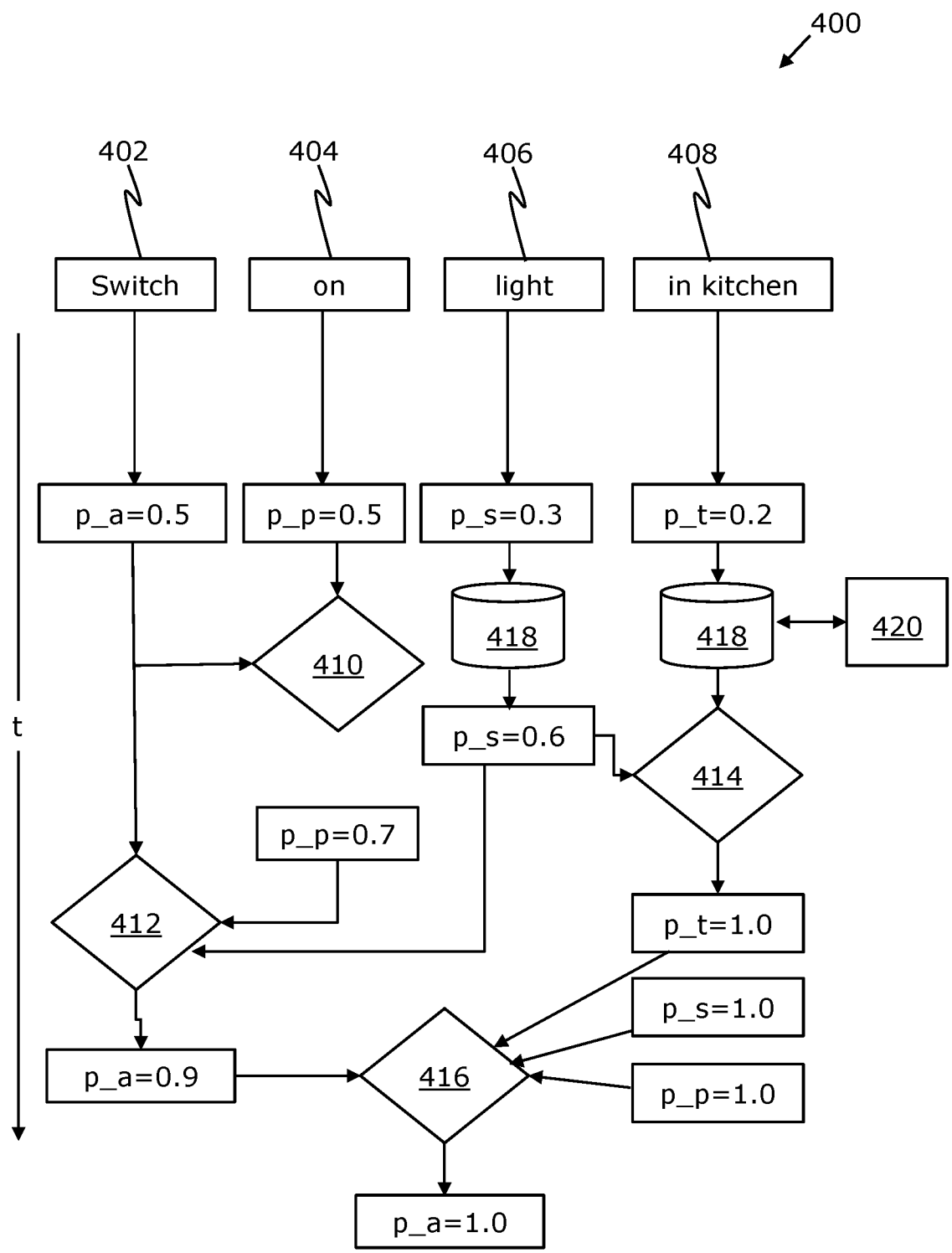
FIG. 4 is a flowchart depicting evolution of probability value of the plurality of classes as a function of time, in accordance with an embodiment of the present disclosure.

Referring to FIG. 4, illustrated is a flowchart 400 depicting evolution of probability value of the plurality of classes as a function of time, in accordance with an embodiment of the present disclosure. As shown, a stream of voice commands consisting of words "Switch" 402, "off" 404, "light" 406, and "in kitchen" 408 is received as a function of time (timeline illustrated as t) as mentioned before with respect to FIG. 3. Herein, the timeline is indicated downwards to illustrate evolution of probability values as the time progresses and more words are received by a voice managing server (such as the voice managing server 310 of FIG. 3). As indicated with calculation blocks 410, 412, 414 and 416, associated with a confidence score estimation module (such as the confidence score estimation module 312 of the FIG. 3) of the voice managing server, the probability values of each of the words (402, 404, 406 and 408) of the voice command can have impact on others in an iterative manner. As shown, a database 418 of voice-controlled devices 420 (for example, one or more home appliances) is communicably coupled to the voice managing server. The database 418 stores information related to the voice-controlled devices 420 and are used while adjusting the probability values of the words of the voice command as well as the voice command itself. Moreover, the database 418 is in connection with the voice-controlled devices 420 via the voice managing server or a user device (such as the user device 208 of FIG. 2) or any other arrangement configurable to control the said database 418 and/or the voice-controlled devices 420.

As shown, an initial probability associated with the one or more classes to which the words (402, 404, 406 and 408) of the voice command belong to may be action class probability ($p\_a$) of 0.5, parameter class probability ($p\_p$) of 0.5, subject class probability ($p\_s$) of 0.3 and target class probability ($p\_t$) of 0.2. Moreover, the probability values of each of the first and second action intended words can have impact on the others in an iterative manner. As the stream of voice command is received and processed, it is determined that the words "Switch" and "off" are closely related and when uttered together suggest turning off or closing something. Therefore, the $p\_p$ of 0.5 is altered to $p\_p$ of 0.7 of the word "off" by the calculation block 410 after being analyzed to be the parameter class associated with the action class "Switch". Subsequently, the word "light" 406 is received and analyzed to be belonging to the subject class and thus the $p\_s$ of 0.3 is altered to $p\_s$ of 0.6 after confirming the subject class from the database 418 of voice-controlled devices 420. At this stage, the calculation block 412 alters the probability value $p\_a$ of 0.5 to $p\_a$ of 0.9 based on the words "off" 404 and "light" 406. Similarly, the word "in kitchen" 408 is received and analyzed to be belonging to the target class and thus the $p\_t$ of 0.2 is altered to $p\_t$ of 1.0 after confirming the target class from the database 418 of voice-controlled devices 420. At this stage, the calculation block 414 alters the probability values $p\_p$ of 0.7 to $p\_p$ of 1.0 and $p\_s$ of 0.6 to $p\_s$ of 1.0 based on the sequential utterance of words "off" 404, "light" 406, and "in kitchen" 408. At this stage, the calculation block 416 alters the probability values $p\_a$ of 0.9 to $p\_a$ of 1.0 based on the final probability values of $p\_p$ of 1.0, $p\_s$ of 1.0 and $p\_t$ of 1.0.

Figure 5:
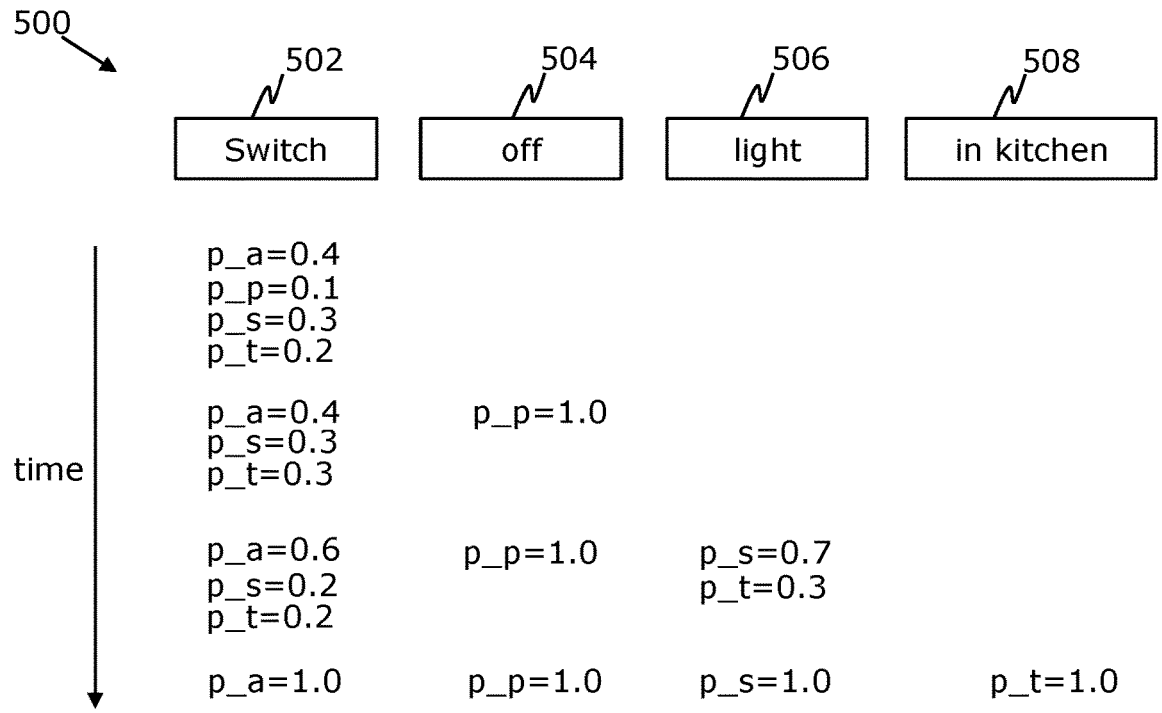
FIG. 5 is a timeline diagram of evolution of probability values of the plurality of classes, in accordance with an embodiment of the present disclosure.

Referring to FIG. 5, illustrated is a timeline diagram 500 of evolution of probability values of the plurality of classes, in accordance with an embodiment of the present disclosure. As shown, each word, i.e. "Switch" 502, "off" 504, "light" 506, and "in kitchen" 508, of the voice command may belong to one or more classes of the plurality of classes selected from: action class, parameter class, subject class and target class. Initial probability value associated with each of the aforesaid classes depends on distribution of the words (502, 504, 506 and 508) in natural language. Notably, the probability value for each of the plurality of classes is adjusted based on rules or historical statics by taking into account the meaning in context of the spoken words and their distribution in the voice command. As shown, the word "Switch" 502 is received first and probability values of the word "Switch" 502 to be belonging to the action class ($p\_a$), the parameter class ($p\_p$), the subject class ($p\_s$) or the target class ($p\_t$) is assigned as 0.4, 0.1, 0.3 and 0.2, respectively. Subsequently, the word "off" 504 is received and assessed based on either rules or historical statistics of meaning thereof. Since the word "off" 504 is spoken in continuation with the word "Switch" 502, therefore it is clarified that the word "off" 504 belongs to the parameter class and thus assigned a probability value associated with parameter class, i.e. $p\_p=1.0$. Since $p\_p$ is 1.0 for the word "off" 504, then $p\_p$ is 0 for the word "Switch" 502, and thus the probability values associated with the word "Switch" 502 is altered. At this stage the first alteration of probability values for the word "Switch" 502 result in $p\_a=0.4$, $p\_s=0.3$ and $p\_t=0.3$.

Similarly, the word "light" 506 is received and assessed based on either rules or historical statistics of meaning thereof. Since the word "light" 506 is spoken in continuation with the words "Switch" 502 and "off" 504, therefore it is clarified that the word "light" 506 belongs to either the subject class or the target class, and thus assigned a probability value associated with the subject class, i.e. $p\_s=0.7$, and the target class, i.e. $p\_t=0.3$. Since $p\_p$ is 1.0 for the word "off" 504, thus the probability values associated with the word "Switch" 502 and the word "light" 506 are altered. At this stage the second alteration of probability values for the word "Switch" 502 result in $p\_a=0.6$, $p\_s=0.2$ and $p\_t=0.2$, based on the probability values of the word "off" 504 and the word "light" 506.

Similarly, the word "in kitchen" 508 is received and assessed based on either rules or historical statistics of meaning thereof. Since the word "in kitchen" 508 is spoken in continuation with the words "Switch" 502, "off" 504, and "light" 506, therefore it is clarified that the word "in kitchen" 508 belongs to the target class, and thus assigned a probability value associated with the target class, i.e. $p\_t=1.0$. Since $p\_p$ of the word "off" 504 is 1.0 and $p\_t$ for the word "in kitchen" 508 is 1.0, therefore the probability values associated with the word "Switch" 502 and the word "light" 506 are altered. At this stage the second alteration of probability values for the word "light" 506 result in $p\_s=1.0$, based on the probability value of the word "in kitchen" 508, hence third alteration of probability values for the word "Switch" 502 result in $p\_a=0.1$, based on the probability values of the word "off" 504, the word "light" 506 and the word "in kitchen" 508.

Figure 6:
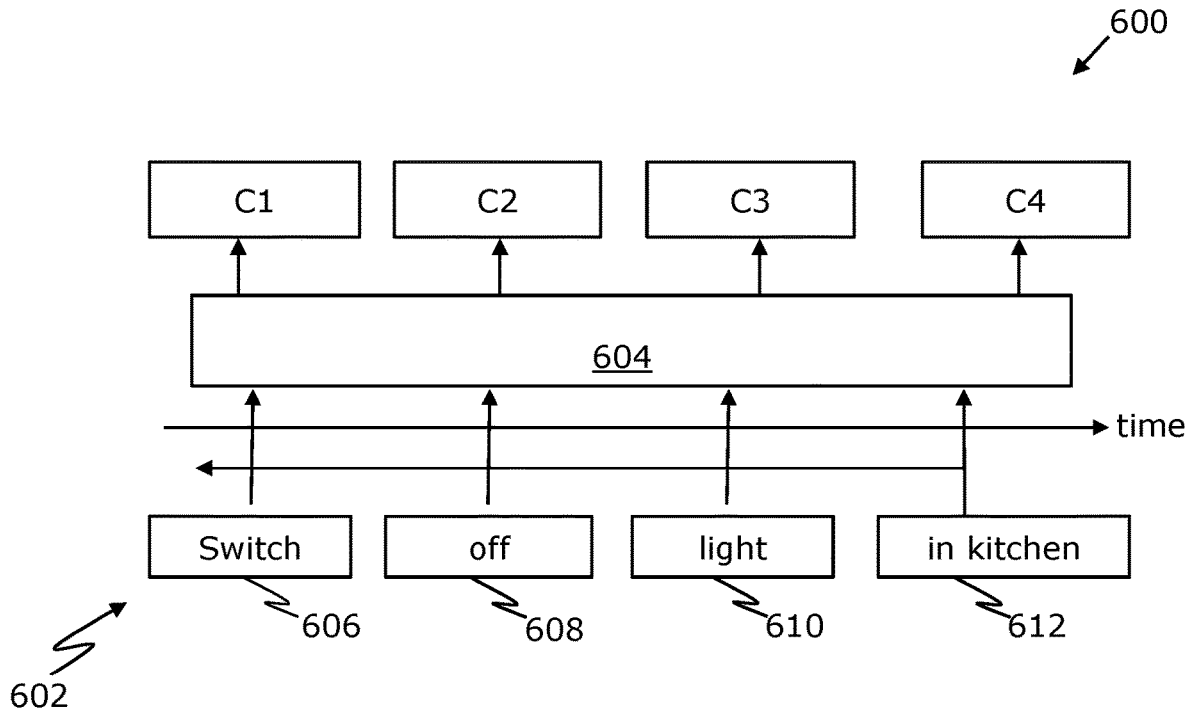
FIG. 6 is a timeline diagram depicting evolution of confidence scores associated with the voice command in a neural network, in accordance with an embodiment of the present disclosure.

Referring to FIG. 6, illustrated is a timeline diagram 600 depicting evolution of confidence scores associated with the voice command 602 in a neural network 604, in accordance with an embodiment of the present disclosure. As shown, the voice command 602 is fed to a long-term short-term type neural network 604 (for example, recurrent neural network) as voice or text (after voice-to-text conversion). The neural network 604 determines confidence score C1, C2, C3 and C4 of each of the words "Switch" 606, "off" 608, "light" 610, and "in kitchen" 612, of the voice command, as received. As shown, the neural network 604 is implemented as backward propagating, i.e. this way the confidence scores, C1, C2, C3 and C4, associated with the words (606, 608, 610 and 612) vary as the voice command 602 is received and analyzed. Notably, when any of the confidence scores, C1, C2, C3 and C4, for each of the words (606, 608, 610 and 612) is higher than the pre-determined value then the action intended by the voice command 602 is executed.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A method for voice recognition to perform an action, the method comprising:
   receiving a voice command;
   identifying a first action intended word from the voice command;
   assigning a confidence score to the first action intended word;
   altering the confidence score of the first action intended word in a temporal manner, based on confidence scores of second action intended words following the first action intended word in the voice command;
   identifying the action when the confidence scores of the first action intended word and the second action intended words reach a pre-determined confidence score associated therewith; and
   performing the identified action, wherein the method further comprises:
   altering the confidence score of the second action intended words, wherein altering the confidence score of the first action intended word and the second action intended words comprises altering the one or more probability values of the first action intended word and the second action intended words in the temporal manner, and the altered one or more probability values allow the confidence scores to reach the pre-determined confidence score when each of the first action intended word and the second action intended words belong to one class of the plurality of classes.

2. The method according to claim 1, wherein assigning the confidence score to the first action intended word and second action intended words comprises assigning one or more probability values of belonging to one or more classes of a plurality of classes.

3. The method according to claim 2, wherein the plurality of classes are defined based on an intent of the voice command.

4. The method according to claim 3, wherein the plurality of classes comprises an action class, a parameter class, a subject class and a target class.

5. The method according to claim 1, wherein the temporal manner is associated with a time period defined with a start time and an end time of the voice command.

6. The method according to claim 5, wherein the time period includes a plurality of moments of time associated with the first and second action intended words identified in the voice command.

7. The method according to claim 1, wherein performing the identified action comprises operating functions of a voice-controlled device.

8. The method according to claim 1, wherein the voice command is received as a streaming audio and the first action intended word is identified from the streaming audio before the words following the first action intended word are received in the same stream.

9. A system for voice recognition to perform an action, the system comprising:
   one or more voice-controlled devices, and
   a voice managing server communicably coupled to the one or more voice-controlled devices, the voice managing server configured to:
   receive a voice command,
   identify a first action intended word from the voice command,
   assign a confidence score to the first action intended word,
   alter the confidence score of the first action intended word in a temporal manner, based on confidence scores of second action intended words following the first action intended word in the voice command,
   identify the action when the confidence scores of the first action intended word and the second action intended words exceed a pre-determined confidence score associated therewith;
   perform the identified action associated with one or more voice-controlled devices; and
   alter the confidence score of the second action intended words, wherein altering the confidence score of the first action intended word and the second action intended word comprises altering the one or more probability values of the first action intended word and the second action intended words in the temporal manner, and the altered one or more probability values allow the confidence scores to reach the pre-determined confidence score when each of the first action intended word and the second action intended words belong to one class of the plurality of classes.

10. The system according to claim 9, further comprising a user device, communicably coupled to the voice-controlled device and the voice managing server, for providing the voice command to the voice managing server.

11. The system according to claim 9, further comprising one or more databases, communicably coupled to the voice managing server, having information related to the one or more voice-controlled devices.

12. The system according to claim 9, wherein the voice managing server is configured to assign and alter the confidence score based on the information related to the one or more voice-controlled devices.

13. The system according to claim 9, wherein the voice managing server employs one or more neural network, rule-based or Boolean-based algorithms for assigning and altering the confidence score of the first and second action intended words.

14. A voice managing server for voice recognition to perform an action associated with a voice-controlled device, the voice managing server configured to:
   receive the voice command,
   identify a first action intended word from the voice command,
   assign a confidence score to the first action intended word,
   alter the confidence score of the first action intended word in a temporal manner, based on confidence scores of second action intended words following the first action intended word in the voice command, identify the action when the confidence scores of the first action intended word and the second action intended words exceed a pre-determined confidence score associated therewith, perform the identified action by the voice-controlled device; and alter the confidence score of the second action intended words, wherein altering the confidence score of the first action intended word and the second action intended word comprises altering the one or more probability values of the first action intended word and the second action intended words in the temporal manner, and the altered one or more probability values allow the confidence scores to reach the pre-determined confidence score when each of the first action intended word and the second action intended words belong to one class of the plurality of classes.

15. A voice managing server according to claim 14, wherein the server is configured to receive the voice command as a voice stream and the second action intended words following the first action intended word are received in the same voice stream temporarily after the first action intended word.

* * * * *